US 6,651,158 B2

(12) United States Patent
Burns et al.

(10) Patent No.: US 6,651,158 B2
(45) Date of Patent: Nov. 18, 2003

(54) DETERMINATION OF APPROACHING INSTRUCTION STARVATION OF THREADS BASED ON A PLURALITY OF CONDITIONS

(75) Inventors: David W. Burns, Portland, OR (US); James D. Allen, Portland, OR (US); Michael D. Upton, Portland, OR (US); Darrell D. Boggs, Aloha, OR (US); Alan B. Kyker, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 09/888,274

(22) Filed: Jun. 22, 2001

(65) Prior Publication Data

US 2002/0199089 A1 Dec. 26, 2002

(51) Int. Cl.[7] .................................. G06F 9/46
(52) U.S. Cl. ........................ 712/205; 709/103
(58) Field of Search ........................ 709/103; 712/205

(56) References Cited

U.S. PATENT DOCUMENTS 6,052,708 A * 4/2000 Flynn et al. ............... 709/108
6,073,159 A * 6/2000 Emer et al. ............... 709/103
6,212,544 B1 * 4/2001 Borkenhagen et al. ...... 709/103
2003/0023658 A1 * 1/2003 Kalafatis et al. ............ 709/102

FOREIGN PATENT DOCUMENTS

| EP | 0 488 501 A2 | 9/1991 |
| EP | 0 617 361 A2 | 3/1994 |
| WO | WO 01/04750 A1 | 6/2000 |

OTHER PUBLICATIONS

Susan J. Eggers et al., Simultaneous Multithreading: A Platform for Next–Generation Processors, Sep./Oct. 1997, IEEE Micro, pp. 12–19.
David W. Burns, Pre–Silicon Validation of Pentium4's SMT Capabilities, Intel Design and Test Technology Conference, pp. 1–5.

* cited by examiner

Primary Examiner—Kenneth S. Kim
(74) Attorney, Agent, or Firm—Kenyon & Kenyon

(57) ABSTRACT

In a multi-threaded processor, thread priority variables are set up in memory. According to an embodiment of the present invention, several conditions are monitored so as to determine an indication of instruction side starvation may be approaching. If such starvation is approaching, the starvation is resolved upon the expiration of a threshold counter or the like.

30 Claims, 3 Drawing Sheets

DETERMINATION OF APPROACHING INSTRUCTION STARVATION OF THREADS BASED ON A PLURALITY OF CONDITIONS

BACKGROUND OF THE INVENTION

The present invention pertains to the operation of a processor or the like. More particularly, the present invention pertains to resolving instruction starvation for a thread in a multi-threaded processor.

As is known in the art, a processor includes a variety of sub-modules, each adapted to carry out specific tasks. In one known processor, these sub-modules include the following: an instruction cache, an instruction fetch unit for fetching appropriate instructions from the instruction cache; decode logic that decodes the instruction into a final or intermediate format, microoperation logic that converts intermediate instructions into a final format for execution; and an execution unit that executes final format instructions (either from the decode logic in some examples or from the microoperation logic in others). As used herein final format instructions are referred to as microoperations.

Programming code to be executed by the processor can sometimes be broken down into smaller components referred to as "threads." A thread is a series of instructions whose execution achieves a given task. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. Stated another way, a thread is a self contained program that is usually associated with a thread identifier and during execution in a multi-threaded environment its architectural state can be maintained while executing instructions from another thread.

In most processors, threads are processed by a processor in succession. In general, it is accepted practice that the execution of decoded microoperations should take precedence over the fetching of new, undecoded instructions. This is because, it is more likely that the decoded microoperations will be appropriately executed, while newly, fetched instructions may eventually be "killed" as a result of a branch misprediction, for example. Starting the instruction fetch after execution of these microoperations however, is not always masked, resulting in some period of delay waiting for decoded instructions to refill the execution pipeline. Thus, the execution of instructions for one thread can be negatively impacted The use of multi-threaded processors has been suggested in the art. In such a processor, it may switch between execution of two or more threads. In other multi-threaded processors, the threads may be executed simultaneously. In either of these processors, there may be no delineation between how the threads are treated. In particular, code from one thread is given the same priority as code from another thread. This could lead to a negative impact on overall system performance, especially when execution of critical code is suspended or slowed by the execution of non-critical code. The accepted practice of giving preference to the execution of microoperations over the fetching of new instructions could have an increased negative impact in a multithreaded processor, especially if the decoded microoperations are for a first thread and the instructions to be fetched are for a second thread that is to be processed simultaneously (or in parallel) with the first thread. There may exist a situation where the processing of the first thread either blocks or unduly delays instruction fetching for the second thread. For the second thread, this can be referred to as instruction side (Iside) starvation.

In view of the above, there is a need to detect and resolve instruction starvation in a multi-threaded processor.

DETAILED DESCRIPTION

Figure 1:
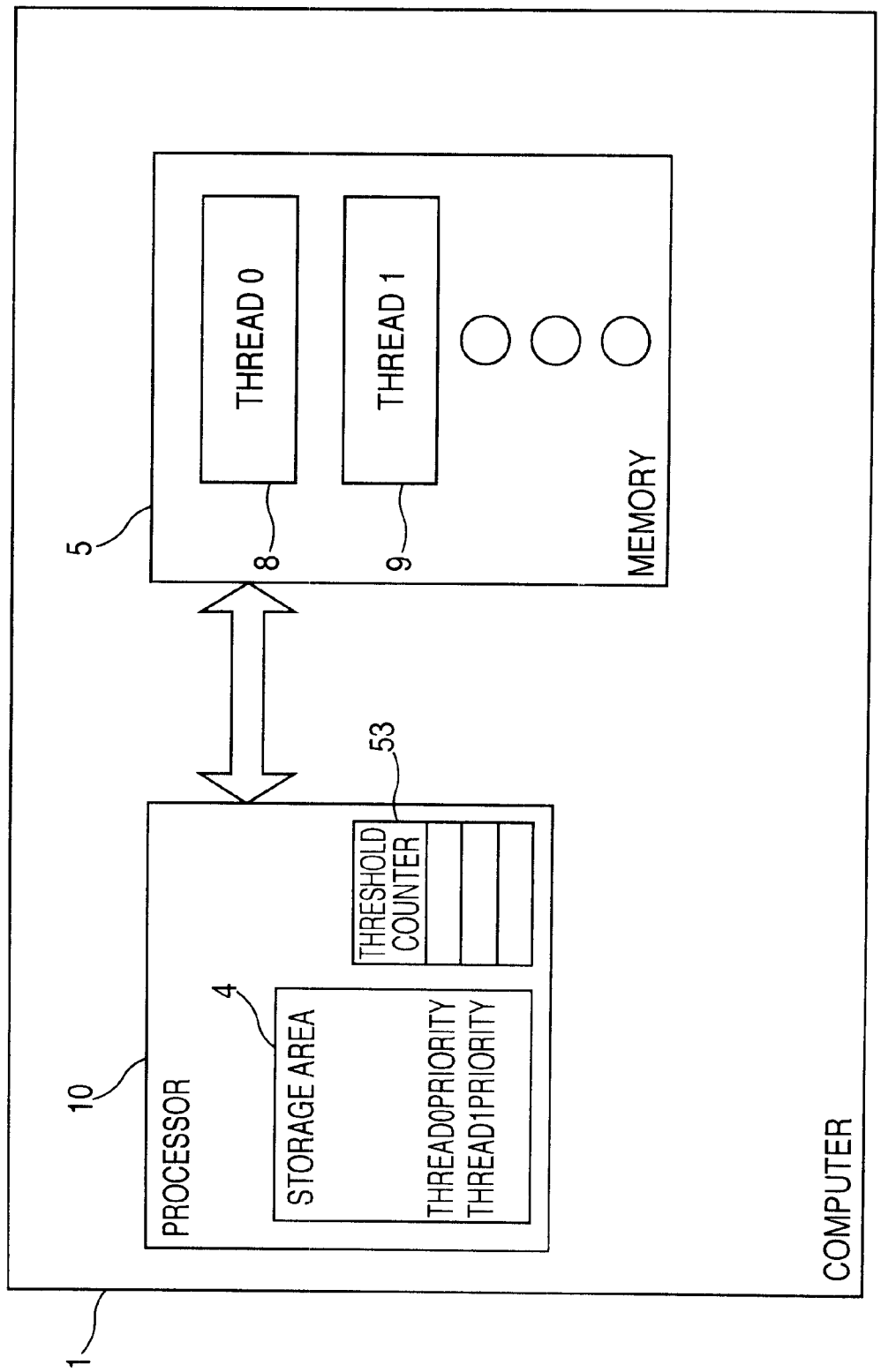
FIG. 1 is a block diagram of a computer system operated according to an embodiment of the present invention.

Referring to FIG. 1 a block diagram of a computer system operated according to an embodiment of the present invention is shown. In this example the computer system 1 includes a processor 10, which is capable of executing code stored in memory 5. In this example, memory 5 stores code for several threads, such as code for thread 0 (8), thread 1 (9), etc. As known in the art, code for two threads may be part of user applications and for the operating system.

Figure 2:
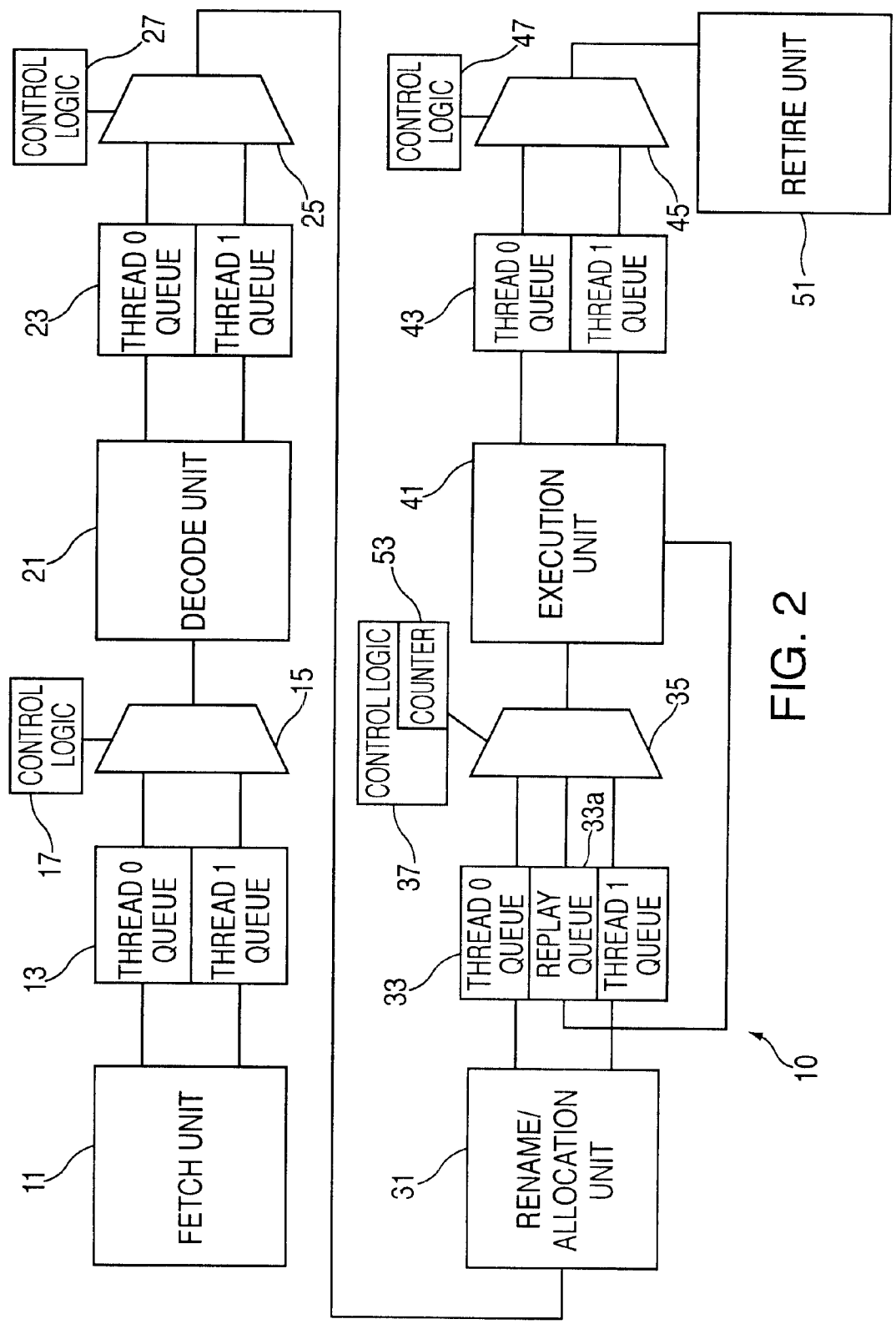
FIG. 2 is a block diagram of a portion of a processor system constructed according to an embodiment of the present invention.

Referring to FIG. 2, a block diagram of a processor system (e.g., a microprocessor, a digital signal processor, or the like) operated according to an embodiment of the present invention is shown. In this embodiment, the processor is a multi-threaded processor where the processor 10 is theoretically divided into two or more logical processors. As used herein, the term "thread" refers to an instruction code sequence. For example, in a video phone application, the processor may be called upon to execute code to handle video image data as well as audio data. There may be separate code sequences whose execution is designed to handle each of these data types. Thus, a first thread may include instructions for video image data processing and a second thread may be instructions for audio data processing. In this example, there are one or more execution units (e.g., including execution unit 41), which may execute one or more instructions at a time. The processor system 10, however, may be treated as two logical processors, a first logical processor executing instructions from the first thread and a second logical processor executing instructions from the second thread.

In this embodiment of the processor system 10, instructions and/or bytes of data are fetched per thread by fetch unit 11 and supplied to a queue 13 and stored as part of the thread 0 queue or the thread 1 queue. One skilled in the art will appreciate that the queues used in processor system 10 may be used to store more than two threads. Instructions from the two threads are supplied to a multiplexer (MUX) 15, and control logic 17 is used to control whether instructions from thread 0 or thread 1 are supplied to a decode unit 21. Decode unit 21 may convert an instruction into two or more microinstructions and supplies the microinstructions to queue 23 (in a RISC (reduced instruction set code) processor, the instructions may already be in a decoded format and the decode unit 21 converts them into a format for execution). The outputs of queue 23 are supplied to a MUX 25 which supplies instructions from thread 0 or thread 1 to a rename/allocation unit 31 based on operation of control logic 27. The rename/allocation unit 31, in turn, supplies instructions to queue 33. MUX 35 selects between the thread 0 queue and the thread 1 queue based on the operation of schedule control logic 37, which can, for example, select instructions from thread 0 and thread 1 based on available resources in the execution unit 41. The output of MUX 35 is supplied to an out of order execution unit 41, in this embodiment, which executes the instruction. The instruction is then placed in queue 43. The outputs of queue 43 are supplied to a MUX 45 which sends instructions from thread 0 and thread 1 to a retire unit 51 based on the operation of control logic 47.

In FIG. 2, branch prediction circuitry may be added to assist in the efficiency of processor system 10. For example, branch prediction circuitry may be added to fetch unit 11. As known in the art, branch prediction concerns predicting may be based on past history of execution code sequences, for example, whether a branch instruction (e.g., BNE—Branch if Not Equal) will be taken. Once a branch has been predicted, the next instructions can be loaded into the "pipeline" (e.g., the units leading up to the execution unit 41), so that if the branch is taken as predicted, the appropriate instructions are immediately available for the execution unit. If the branch prediction is incorrect, then the instructions in the pipeline are incorrect and must be flushed out and the appropriate instructions loaded into the pipeline.

In one example of a multi-threaded processor, two threads may be processed in parallel. Given the teachings herein, the present invention can be expanded to three or more threads processed in parallel. In this embodiment, the term "parallel" includes simultaneous and/or successive processing/execution of instructions. As used herein, thread priority is used to determine which thread gets to use shared resources when both threads need to use the same resource simultaneously. Thread priority could be indicated by one or more signals stored in the processor 10 (e.g., in storage area 4 in FIG. 1). For example, Thread0Priority and Thread1Priority would indicate which of the two threads (thread0 or thread1) has priority over the other. In one example, if both signals are turned off, then neither of the threads has priority over the other.

As indicated above, there may arise situations where a first thread will have more access to shared resources than another thread. For example, a first thread may have a number of decoded microoperations being executed in the processor while the second thread is waiting for a specified result from the execution of the first thread. If the second thread has taken up a number of shared resources while waiting for the result, this could severely impact the processing of the first thread and could completely block the processing of the first thread. For example, the domination of a portion of these resources by the second thread could effectively prevent the fetching of instructions for the first thread. Thus, the processing of the first and second threads effectively stalls resulting in poor execution performance of the processor. As another instance of this problem, a first thread could be performing store operations to higher levels of cache or to main memory where the second thread seeks to retrieve instructions. Data operations to memory are commonly given priority over instruction fetch operations to the same memory. Accordingly, if the first thread has a large number of store operations to perform, the second thread will be effectively blocked from fetching instructions and making forward progress on execution.

Figure 3:
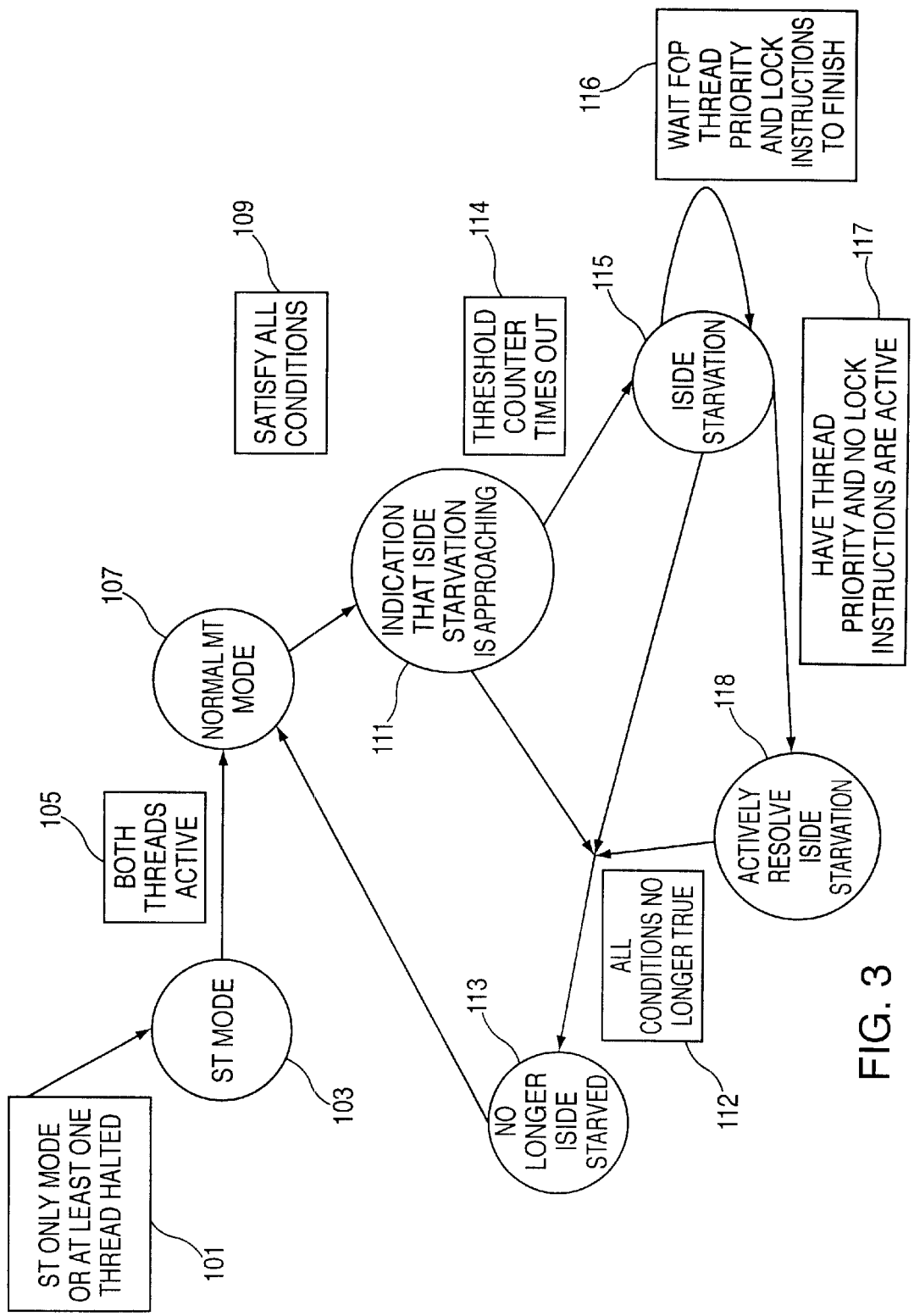
FIG. 3 is a state diagram for the detection and resolution of instruction starvation according to an embodiment of the present invention.

According to an embodiment of the present invention, instruction side starvation is detected for any of a variety of threads. Referring to FIG. 3, a state diagram for detecting and resolving Iside starvation is shown. In one embodiment, an indication that Iside starvation may be approaching (i.e., "worried" about Iside starvation) is based on satisfaction of a number of conditions. In general, Iside starvation is when a thread cannot fetch instructions because the other thread(s) has/have effectively blocked it from doing so. As used herein, an indication of approaching Iside starvation is an indication that such a situation may be approaching for a thread. A first condition for approaching Iside starvation is that the processor is in a multithreaded processing mode as compared to a single threaded processing mode and more than one thread is active. In FIG. 3, block 101 indicates that the processor is in a Single Tread (ST) mode. This can mean that a control signal indicating such has been set or in the case of a processor handling only two threads at a time, where one of those threads is halted in execution. In this case, control starts in block 103 (ST Mode). If both threads are active (block 105), in that the processor is at least attempting to fetch and/or execute instructions from at least first and second threads, then control shifts to block 107 (Normal MT (multi-threaded) Mode). As indicated above, an indication that a thread may become Instruction side starved is based on satisfaction of several conditions. When all of those conditions are satisfied (block 109), control moves to block 111. The first condition, described above is that the processor be in multi-threaded mode.

Other conditions may include the following:

2. The thread under consideration (e.g., either thread0 or thread1) does not have any instructions in the execution pipeline (e.g., there are no instructions waiting at MUX 35 for the schedule control logic 37 to cause microoperations for that thread to be passed to the execution unit 41 (FIG. 2)).

3. The issuing of new instructions to the execution pipeline is not blocked because the thread under consideration has filled a needed resource. In this embodiment, the execution pipeline includes the processing of instructions from the MUX 35 through the execution unit 41. For example, the execution unit 41 may include a store buffer for the thread under consideration that is filled with store instructions. In such a case, the processing of the thread has not necessarily been negatively impacted by the lack of instruction fetching, but the delay in execution of store instructions. Moreover, taking action to increase instruction fetching would not appreciably improve thread performance because the lack of availability of the resource would negatively impact the execution of these instructions.

4. Any thread other than the thread under consideration has not been given full or exclusive access to the processor components. In such a situation, any instruction starvation on the part of the thread under consideration would be intended.

5. The thread under consideration is in a state where it is trying to fetch instructions. For example, in many processors including those manufactured by Intel Corporation (Santa Clara, Calif.) include a "Stop Clock" pin. An assertion of a signal on this pin results in the processor clearing out its resources. In this case, all resources may be clear of executable instructions for the thread under consideration. Accordingly, the lack of instruction fetching would not be considered starvation in such a case. Switching from a multi-thread mode to a single thread mode is another example when instruction starvation should not be considered a problem.

6. A higher order performance saving protocol is not active. For example, if there is another protocol in effect to switch priority from one thread to another, then running this protocol with instruction starvation handling of the present invention may have a negative impact on processor performance.

7. An instruction starvation enable bit is set (i.e., bit that can be set by control logic to turn off Iside starvation detection/resolution).

8. The thread under consideration is not waiting for an instruction fetch that has gone off-chip (e.g., off the processor such as main memory)

In this embodiment, if all monitored conditions are met then there is an indication of approaching Iside starvation for a thread. Though eight conditions are presented above, the present invention can be expanded to additional conditions or a fewer number of conditions. For example, the indication of approaching Iside starvation could be based solely on conditions 1, 2, and 5 above being true. Also, the implementation of the flow diagram of FIG. 3 can be performed by properly configured control logic (e.g., including control logic 37 in FIG. 2). Alternatively, control logic can be a sub-module of the processor 10 that executes instructions to implement the flow diagram of FIG. 3.

Referring back to FIG. 3, in this embodiment, if all seven conditions are satisfied, then control passes to block 111 meaning that there is an indication that instruction starvation for a thread may occur. Accordingly, an Iside starvation threshold counter is started to perform a counting operation. In this embodiment, the threshold counter 53 (FIG. 1) can be a down counter that counts from a loaded value down to 0 based on a system clock. The value to be loaded into this counter can be set through control logic or the operation of microcode in the processor, for example (or any other hardware or firmware implementation). If any of the conditions mentioned above are no longer valid (block 112), then control passes to block 113 indicating that there is no longer a concern for Iside starvation. If the threshold counter 53 reaches a predetermined value (e.g., times out or counts down to 0)(block 114), control passes to block 115, indicating instruction side starvation. In this embodiment, the threshold counter 55 gives the thread under consideration an opportunity to load instructions thus negating one or more of the above conditions.

According to an embodiment of the present invention, Iside starvation for a thread can be resolved so as to restore instruction fetching operations for the starved thread. Referring back to FIG. 3, control remains in block 115 while the instruction starved thread does not have priority (e.g., as indicated by the Thread0Priority and Thread1Priority signals) and any lock instructions are active (block 116). In this embodiment, a lock instruction is an instruction that needs exclusive access to a memory location. For example, an "atomic" operation is one where a data value is retrieved from a memory location, modified, then restored to the same memory location. In such an atomic operation, the specified memory location must be locked so that there are not intermediate accesses to the memory location until the operation is completed. When priority is assigned to the instruction-starved thread and no locking mechanism is active (block 117), control passes to block 118 to actively resolve the Iside starvation. In this embodiment of the present invention, resolution of Iside starvation includes the performance of one or more operations to provide instruction execution for the starved thread. This can be achieved through performing one or more of the following:

1. Moving instructions from the non-starved thread from the execution pipeline to a temporary storage area (e.g., a replay queue 33a) for later execution. Alternatively, the active instructions could be "killed" and reissued at a later time;

2. Preventing lock instructions from being initiated from the non-starved thread(s);

3. Evicting all write back buffers in cache memory, so as to free up that resource for the instruction starved thread;

4. Resetting reservation registers for the cache (e.g., remove exclusive access to resources that may be set up for the non-starved thread); and 5. Having control logic 37 not select instructions from the non-starved thread(s).

Once one of the conditions that serve as an indication that Iside starvation is approaching is not longer satisfied, control then moves back to block 113 to reset the state of the processor to indicate that there is no longer any immediate concern for instruction-side starvation for any thread.

Using the method and apparatus of the present invention, the detection and resolution of instruction side starvation for a thread can be handled in an efficient manner. Embodiments of the present invention can dramatically reduce the amount of time it takes to make sure that a thread that is lacking access to the processor resources, obtains that access.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. In a multi-threaded processor, a method of assigning thread priority comprising:
   determining whether a plurality of conditions are present in said processor;
   determining, based on satisfaction of said plurality of conditions, whether there is an indication of approaching instruction side starvation for a first thread of at least two threads.

2. The method of claim 1 further comprising;
   setting a threshold counter to perform a counting operation in response to an indication of approaching instruction side starvation for said first thread.

3. The method of claim 2 further comprising:
   resolving instruction starvation after said threshold counter completes its counting operation.

4. The method of claim 3 wherein said resolving instruction starvation comprises:
   moving instructions in an execution pipeline of said processor from the second thread to a temporary storage area.

5. In a processor to handle processing of at least first and second threads in parallel, a method of assigning thread priority comprising:
   determining if a plurality of conditions for said first thread are true, the conditions including
      if the processor is operating in a multithreaded processing mode;
      if the first thread has no instructions in an execution pipeline of said processor; and
      if the first thread is attempting to fetch instructions from a memory
   determining that there is an indication of approaching instruction side starvation for said first thread when said plurality of conditions are true.

6. The method of claim 5 further comprising:
   setting a threshold counter to perform a counting operation if said plurality of conditions are true.

7. The method of claim 6 further comprising:
   resolving instruction starvation after said threshold counter completes its counting operation.

8. The method of claim 5 further comprising:
resolving instruction starvation for said first thread by moving instructions in an execution pipeline of said processor from the second thread to a temporary storage area.

9. A multi-threaded processor comprising:
first and second thread queues;
control logic coupled to said first and second thread queues, said control logic to determine whether a plurality of conditions are present in said processor, and determine that there is an indication of approaching instruction side starvation for a first thread of at least first and second threads based on satisfaction of said plurality of conditions.

10. The processor of claim 9 further comprising a threshold counter to perform a counting operation, wherein said control logic is to set said threshold counter if there is an indication of approaching instruction side starvation for said first thread.

11. The processor of claim 10 wherein said control logic is to resolve instruction starvation after said threshold counter completes its counting operation.

12. The processor of claim 11 further comprising an execution pipeline and a temporary storage area wherein said control logic is to move instructions in the execution pipeline of said processor from the second thread to the temporary storage area.

13. A processor to handle processing of at least first and second threads in parallel comprising:
first and second thread queues;
control logic coupled to said first and second thread queues, said control logic to determine if a plurality of conditions are true and to determine whether instruction side starvation is approaching for said first thread based on said conditions, the conditions including
if the processor is operating in a multithreaded processing mode;
if the first thread has no instructions in an execution pipeline of said processor; and
if the first thread is attempting to fetch instructions from a memory.

14. The processor of claim 13 further comprising a threshold counter to perform a counting operation wherein said processor is to set said threshold counter if there is an indication of approaching instruction side starvation for said first thread.

15. The processor of claim 14 wherein said processor is to resolve instruction starvation after said threshold counter completes its counting operation.

16. The processor of claim 15 further comprising an execution pipeline and a temporary storage area wherein said processor is to resolve instruction starvation for said first thread by moving instructions in the execution pipeline of said processor from the second thread to the temporary storage area.

17. A computer system to handle processing of at least first and second threads in parallel comprising:
a memory to store instructions for first and second threads;
a processor coupled to said memory and including
first and second thread queues to store instructions from said first and second threads;
control logic coupled to said first and second thread queues, said control logic to determine whether a plurality of conditions in said processor are true, and determine whether there is an indication of approaching instruction side starvation for said first thread based on satisfaction of said plurality of conditions.

18. The computer system of claim 17 wherein said processor further includes a threshold counter to perform a counting operation, wherein said control logic is to set said threshold counter if there is an indication of approaching instruction side starvation for said first thread.

19. The computer system of claim 18 wherein said control logic is to resolve instruction starvation after said threshold counter completes its counting operation.

20. The computer system of claim 19 wherein said processor further includes an execution pipeline and a temporary storage area wherein said control logic is to move instructions in the execution pipeline of said processor from the second thread to the temporary storage area.

21. A computer system to handle processing of at least first and second threads in parallel comprising:
a memory to store instructions for first and second threads;
a processor coupled to said memory and including
first and second thread queues to store instructions from said first and second threads;
control logic coupled to said first and second thread queues, said control logic to determine if a plurality of conditions are true and to determine whether instruction side starvation is approaching for said first thread based on said conditions, the conditions including
if the processor is operating in a multithreaded processing mode;
if the first thread has no instructions in an execution pipeline of said processor; and
if the first thread is attempting to fetch instructions from a memory.

22. The computer system of claim 21 wherein said processor further includes a threshold counter to perform a counting operation wherein said processor is to set said threshold counter if there is an indication of approaching instruction side starvation for said first thread.

23. The computer system of claim 22 wherein said processor is to resolve instruction starvation after said threshold counter completes its counting operation.

24. The computer system of claim 23 further comprising an execution pipeline and a temporary storage area wherein said processor is to resolve instruction starvation for said first thread by moving instructions in the execution pipeline of said processor from the second thread to the temporary storage area.

25. A set of instructions residing in a storage medium, said set of instructions capable of being executed by a processor to handle processing of at least first and second threads in parallel and assign thread priority comprising:
determining whether a plurality of conditions are present in said processor;
determining whether there is an indication of approaching instruction side starvation for said first thread, based on satisfaction of said plurality of conditions.

26. The set of instructions of claim 25 wherein the method further includes
setting a threshold counter to perform a counting operation if there is an indication of approaching instruction side starvation for said first thread.

27. The set of instructions of claim 26 wherein the method further includes
resolving instruction starvation after said threshold counter completes its counting operation.

28. The set of instructions of claim 27 wherein said resolving instruction starvation includes
   moving instructions in an execution pipeline of said processor from the second thread to a temporary storage area.

29. The set of instructions of claim 25 wherein determining if there is an indication of approaching instruction side starvation for said first thread includes
   determining if a plurality of conditions are true, the conditions including
      if the processor is operating in a multithreaded processing mode;
      if the first thread has no instructions in an execution pipeline of said processor; and
      if the first thread is attempting to fetch instructions from a memory.

30. The set of instructions of claim 29 wherein the method further includes
   resolving instruction starvation for said first thread by moving instructions in an execution pipeline of said processor from the second thread to a temporary storage area.

* * * * *